United States Patent [19]

Schmidt

[11] 4,055,910
[45] Nov. 1, 1977

[54] PICTURE FRAME

[76] Inventor: Hans H. Schmidt, 1905 Pontius Ave., Los Angeles, Calif. 90025

[21] Appl. No.: 701,431

[22] Filed: July 1, 1976

[51] Int. Cl.² .............................................. G09F 1/12
[52] U.S. Cl. .................................. 40/155; 40/125 G; 40/152; 160/381; 403/401
[58] Field of Search ...................... 40/152, 152.1, 155, 40/156, 125 R, 125 H, 125 F, 209, 125 G; 52/656, 657, 476, 285; 403/402, 401, 231; 160/381

[56] References Cited

U.S. PATENT DOCUMENTS

| | | | |
|---|---|---|---|
| 578,200 | 3/1897 | Bower | 40/155 |
| 965,377 | 7/1910 | Dreisbach | 40/155 |
| 1,141,210 | 6/1915 | Pirson | 160/381 |
| 1,184,079 | 5/1916 | D'Arcy | 403/231 |
| 1,441,071 | 1/1923 | Edmonds | 40/155 |
| 2,767,814 | 10/1956 | Johnson | 52/657 X |
| 2,777,232 | 1/1957 | Kulicke | 40/155 |
| 3,003,272 | 10/1961 | Kulicke | 40/155 |
| 3,294,429 | 12/1966 | Halip | 40/152 X |
| 3,603,627 | 9/1971 | Kaffel | 52/656 |
| 3,613,279 | 10/1971 | Belfor | 403/231 X |
| 3,613,280 | 10/1971 | Tuchinsky et al. | 40/155 |
| 3,811,214 | 5/1974 | Tate | 40/152 |

FOREIGN PATENT DOCUMENTS

| | | | |
|---|---|---|---|
| 206,012 | 1923 | United Kingdom | 40/155 |
| 619,766 | 1949 | United Kingdom | 40/152 |

*Primary Examiner*—John F. Pitrelli
*Attorney, Agent, or Firm*—Poms, Smith, Lande & Glenny

[57] ABSTRACT

A frame has channel members extending along each edge of the frame material with each channel member abutting another member at the corner of the framed material. A locking member is slidable between the frame material and the pairs of abutting channel members at each corner of the frame material to hold the channel members together against the frame material. The channel members may have slots therein and the locking members may have protrusions to extend into the slots when the locking member is inserted between the frame material and the channel members. The frame material includes a transparent sheet for displaying an object therethrough and a rigid backing sheet on the other side of the object, and the channel members have a channel width substantially the same as the combined thickness of the transparent sheet, the object, the rigid backing sheet and the locking member. The locking member may also include a spring or other biasing means to create a force between the channel members and the rigid backing sheet to hold the locking member to the channel member. The locking members are L-shaped with outside edges which are inserted between the rigid backing member and the channel members. Along each inside edge of the locking member is an upright member perpendicular to the locking member. The upright member is positioned against the channel members when the locking member is inserted between the frame material and the channel members to prevent relative movement between two adjacent channel members and to provide a grip for removing the locking members. In one embodiment, the slots are tapered, and inserting the protrusion into the slot wedges the channel members together as the protrusions move along the tapered slots.

24 Claims, 8 Drawing Figures

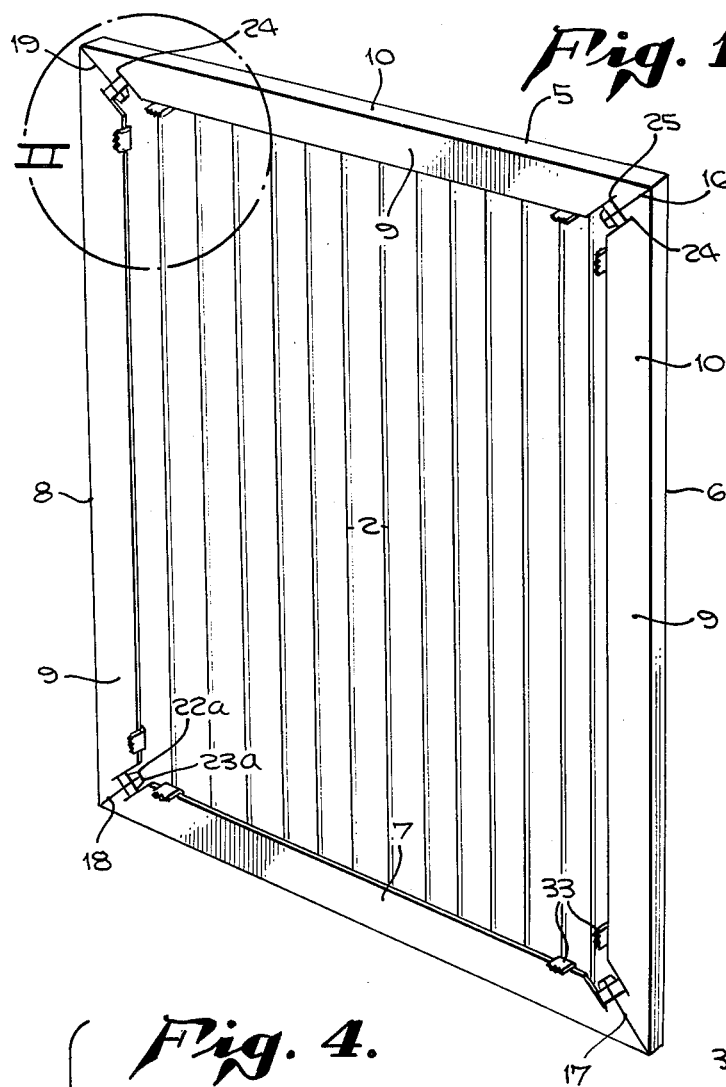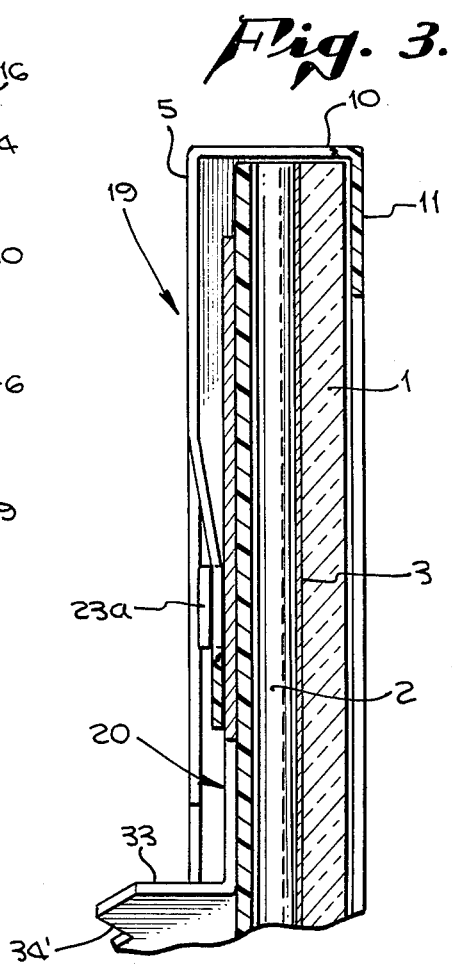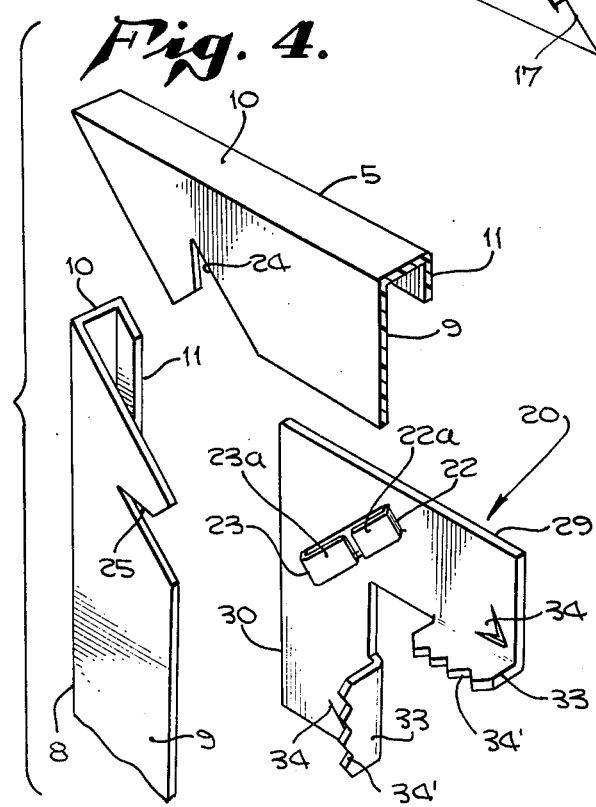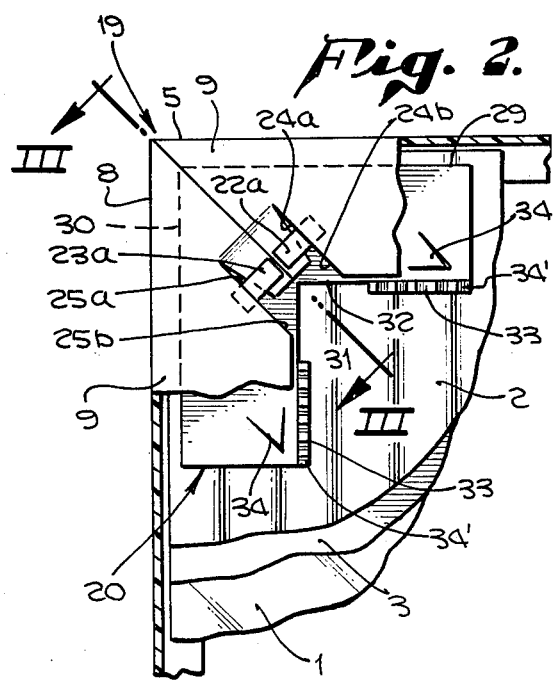

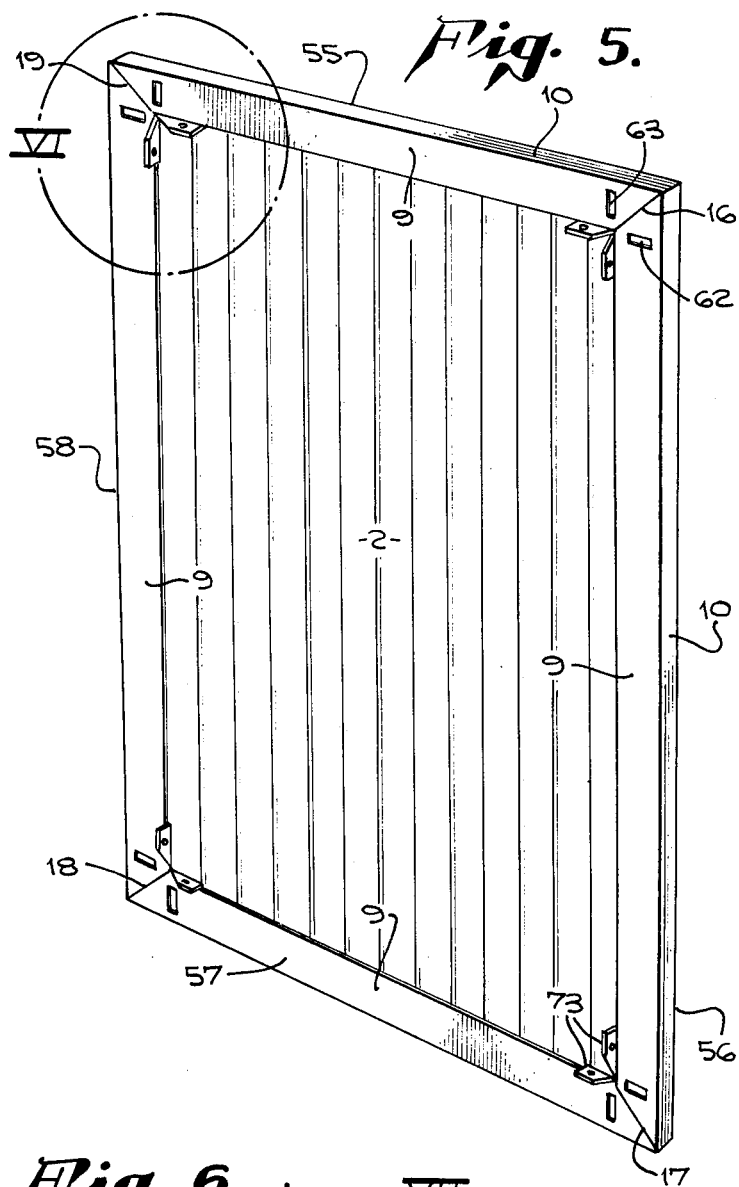
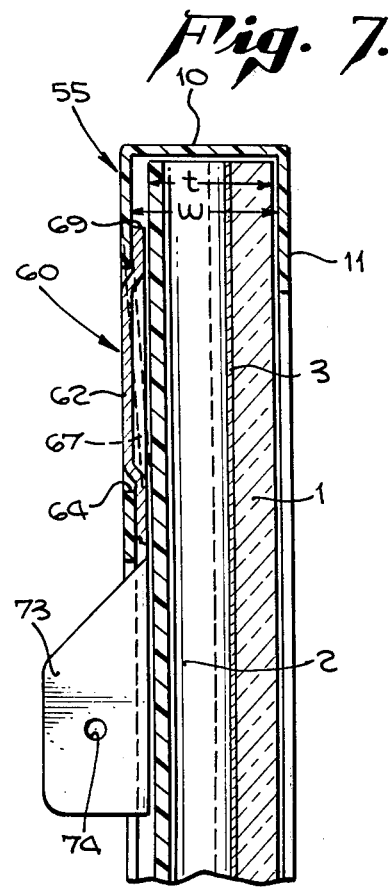
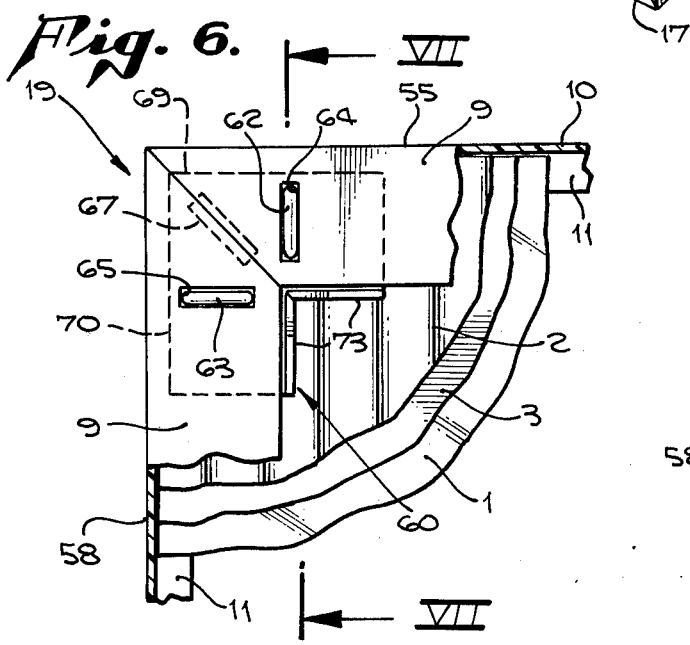
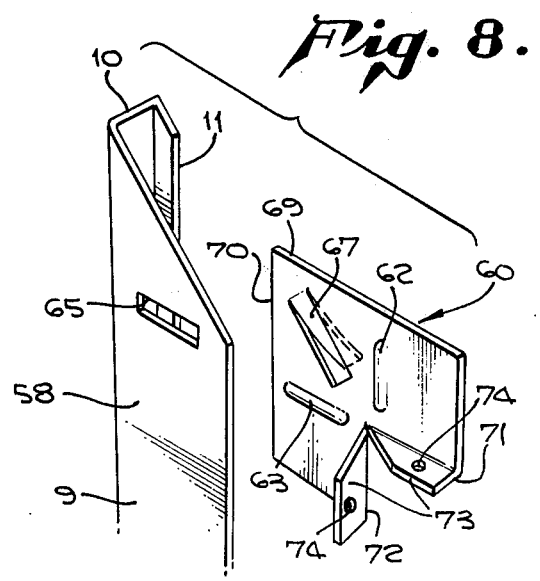

PICTURE FRAME

BACKGROUND OF THE INVENTION

The art of picture framing is a relatively old art. However, until relatively recently, most picture frames were custom-made to fit the picture, but now custom framing for many objects has become impractical because of the cost and because many objects are intended to be framed and displayed for relatively short time periods. This has resulted in an increased need for so-called "ready-made" frames. Examples of some frames are the following references:

| | | |
|---|---|---|
| Bower | 578,200 | March, 1897 |
| Dreisbach | 965,377 | July, 1910 |
| Edmonds | 1,441,071 | Jan., 1923 |
| Kulicke | 2,777,232 | Jan., 1957 |
| Kulicke | 3,033,272 | Oct., 1961 |

SUMMARY OF THE INVENTION

It is an object of the present invention to disclose and provide an improved picture frame which is an improvement over these existing frames. Particularly, the frame of the present invention is made from extruded metal parts which need not be bent in order to be locked. This is a problem in the Bower and Driesbach references. Another problem in the prior art such as Edmonds is that the means for locking the frame members together should not be visible on the front side of the frame. The frame members should abut each other as if there was a custom miter joint between them. It is an object of the present invention to disclose and provide a picture frame with such features. Another object of the present invention is to disclose and provide a picture frame in which any backing sheet may be used. Modifying the backing sheet adds costs and limits the flexibility of the picture frame. This is one of the drawbacks of the Edmonds' patent and the Kulicke patents because either a groove must be added to the backing sheet (Kullicke '232) or holding members must be added to the backing sheet in order to accommodate the locking member.

It is a further object of the present invention to disclose and provide a picture frame which can be manufactured at low costs and yet appears to be almost custom-made. A further object is that the picture frame be readily assemblable and disassemblable while still being sturdy with frame members maintaining their correct alignment. Other objects of the invention will be evident from the following description of the invention.

BRIEF DESCRIPTION OF THE DRAWINGS

FIG. 1 is a perspective view of an exemplary embodiment of the picture frame of the present invention in its assembled condition.

FIG. 2 is a front view of detail II of FIG. 1.

FIG. 3 is a sectional view taken through plane III—III in FIG. 2 and shows in detail the locking member intersecting with the channel member in the assembled position.

FIG. 4 is an exploded view of the locking member and two channel members in a disassembled condition.

FIG. 5 is a perspective view of another exemplary embodiment of the picture frame of the present invention.

FIG. 6 is a front view of detail VI in FIG. 5.

FIG. 7 is a section 5 view of the picture frame of the present invention taken through plane VII—VII in FIG. 6 and shows the second embodiment locking member intersecting with the channel member in the assembled position.

FIG. 8 is an exploded view of the locking member and a channel member of the second embodiment in a disassembled condition.

DETAILED DESCRIPTION OF THE PREFERRED EMBODIMENT

In the following description, corresponding parts in the two embodiments use similar numbers. The picture frame of the present invention is for a picture to be held between a backing sheet and the front sheet in a sandwich. The front sheet 1 should be transparent so that a viewer looking from the right in FIGS. 3 and 7 can view the picture 3 through the front sheet 1. On the other side of the picture from the front sheet 1 is a backing sheet 2 made of wood, plastic or cardboard. In the preferred exemplary embodiment, the backing sheet is a corrugated plastic which is lightweight, flat and resilient to deformation. The transparent front sheet 1, the backing sheet 2 and picture 3 comprise a sandwich. If desired, a mat (not shown) may be placed between picture 3 and front transparent sheet 1 to act as part of the framing and which may be used to separate a photograph from a glass transparent front sheet. The sandwich of the picture and the front and rear sheets is also referred to at times as the "framed material".

Frame means extend around the edges of the framed material. In the exemplary embodiments, the frame means comprise four frame sections 5, 6, 7 and 8 (FIGS. 1-4) or 55, 56, 57 and 58 (FIGS. 5-8). The frame members are formed as extruded channel members. As shown more clearly in FIGS. 4 and 8, channel members 5, 8 and 58 have front portions 11 and rear portions 9 connected together by edge portions 10.

In the exemplary embodiment, the four frame members surround the rectangular sandwich of framed material. The frame members meet at miter joints 16, 17, 18 and 19 abutting one another, and it is in the position shown in FIGS. 1 and 5 that the frame of the present invention is adapted to maintain when material is displayed.

Locking means are slidable between the framed material and a pair of abutting channel members at each corner of the framed material, and means on the channel members receive and hold the locking means whereby the locking means performs the dual function of holding the channel members together and of holding the channel members on the framed material. The channel members include slot means therein and the locking means has protrusion means thereon to extend into the slot means. The slot means receives the protrusion means when the locking means is inserted between the framed material and the channel members to hold the locking means, the framed material and the channel members together. Turning to the first exemplary embodiment shown generally in FIGS. 1 through 4, the locking means 20 is slidable between the framed material and pairs of abutting channel members at each corner. Each channel member has slot means 24, 25 at each end of the channel member. As stated above, the channel members are preferably extruded metal but may be formed of plastic. The slot means 24 and 25 are cut into the rear wall 9 of each channel member simultaneously or after the channel member is cut to length at the mitered edge.

The locking means of the first exemplary embodiment is shown at 20 and includes protrusion means 22 and 23 which extend into slot means 24, 25 respectively. As shown particularly in FIG. 2 in the first exemplary embodiment, slot means 24 and 25 receive the protrusion means 22 and 23 respectively when the locking means 20 is inserted between the framed material (1, 2, 3) and the channel members 5, 8 to hold the locking means, the framed material and the channel members together.

The slot means has tapered side walls, and the protrusions are slidable into the slot means against the side walls to wedge the channel members together. The protrusions 22 and 23 are normally punched from sheet metal and in the process, bridge means 22a and 23a are formed. As shown primarily in the assembled views of FIGS. 1 and 2, the area between slot means 24 and 25 on abutting channel members 5 and 9 on channel wall 9 is secured under the bridge means 22a, 23a which helps hold adjacent channel members together.

However, the channel members are primarily held by protrusion means 22, 23 which are slidable into solts 24, 25 against the side walls of the slot to wedge the channel members together. The slot means 24, 25 extend from the side of the channel member portions opposite the frame edge. In the exemplary embodiment, slot 24 on channel member portion 9 extends from the side opposite frame edge 10. Slot means 24 has two intersecting walls 24a, 24b. The first slot wall 24a which is the nearer the mitered end of the channel is angled away from the channel end from the inside of the channel member portion 9 toward the channel edge 10. In FIG. 2 of the first exemplary embodiment, where slot wall 24b is generally parallel with the mitered edge while first slot wall 24a is angled away from the intersection from the front to the edge of the channel member portion. It is not critical that slot wall 24b be parallel with the miter joint, and it is also not critical that the slot walls 24a and 24b actually intersect. Moreover, first slot wall 24a may be almost parallel with the mitered edge, but some angle is necessary. Slot 25 is essentially a mirror image of slot 24 with side walls 25a and 25b having similar angles to slot walls 24a, 24b.

The protrusion means comprise a pair of protrusions spaced apart on the locking means so that each protrusion fits into the slot means on abutting channel means along the first slot walls to wedge the channel members together. Turning again to the first exemplary embodiment, in FIG. 4, the pair of protrusions are shown at 22 and 23. The protrusions are spaced on the locking means in such a way that when the locking means 20 is inserted between the channel member portions 9 on channel members 5 and 8 and the backing sheet 3 of the framed material, the protrusions 22 and 23 will fit into slots 24 and 25. As the locking means 20 is inserted, the protrusions 22 and 23 contact first slot walls 24a and 25a thereby wedging channel members 5 and 8 together. Eventually, channel members 5 and 8 will be forced against each other. In manufacture, the parts are dimensioned in such a way that the channel members 5 and 8 are brought together in the correct orientation when the locking means 20 is fully inserted under channel member portions 9 when the gripping means 33, the function of which is described hereinbelow, is against the inside walls of the channel member portions 9.

Friction helps to maintain the locking means in the FIG. 2 orientation to keep the channel members together. First, there is friction between channel member portions 9 and the backing sheet 2. The channel members are somewhat resilient and the width of the framed material with the locking means is principally chosen so that channel member portions 9 and 11 must be pushed apart somewhat to insert the locking means 20. Therefore, the resiliency of the material of the channel members will act to pinch the framed material and the locking means together to hold both to the channel member. Friction is also present between the protrusions 22 and 23 and the first slot walls 24a, 25a. As slot wall 24a and 25a become more parallel with each other (but still slightly angled), less force acting from the slot walls 24a, 25a on the protrusions will be directed at forcing the locking means 20 out of the slots. Additionally, tooth means for gripping the framed material are provided to prevent the locking means from being removed from between the channel means and the framed material. In the first exemplary embodiment, the tooth means are shown at 34. The tooth means are partially punched from the locking means 20 and have a point directed downward. Forces on the locking means 20 attempting to force it out of its FIG. 2 location will cause the tooth means 34 to grip the backing sheet 2. When it is desired to remove the locking means, the gripping means 33 may be pulled to slightly pivot the locking means 20 against the resiliency of the channel members to disengage the tooth means 34 from the backing sheet. Thereafter, removal is easily effected.

The use of the tooth means 34 affects the choice of the backing sheet 2. The material chosen must be such that it may be gripped by the tooth means 34.

Referring again to FIG. 4, when the protrusion means 22 and 23 are stamped, bridge means 22a and 23a are formed. The area between the slot means 24, 25 on abutting channel portions 9 on channel members 5 and 8 are secured under the bridge means 22a, 23a for holding the adjacent channel members together. The primary purpose of the bridge means 22a and 23a is to prevent lateral movement of the channel members. The bridge means is effective for this purpose.

Turning to the second exemplary embodiment essentially of FIGS. 5-8, locking means are also slidable between the framed material and a pair of abutting channel members at each corner of the framed material to hold the channel members together on the framed material. Referring particularly to FIG. 7 of the exemplary embodiment, the thickness (t) of the sandwich is slightly less than the width (w) of the inside of the channel member. When the locking means indicated generally at 60 is inserted between wall 9 and rigid backing sheet 2 (FIG. 7), the channel member frictionally holds locking member 60 and the front sheet 1 which frictionally holds the backing sheet 2 and the picture 3. Increasing the force on the locking member and front sheet from the channel member helps to maintain the frame in an assembled state and prevents shifting of members.

The channel members of the second embodiment also have slot means therein and the locking means have protrusions thereon to extend into the slots when the locking means is inserted between the framed material and the channel members. In the second exemplary embodiment, the locking member has an L-shaped surface 61 which is inserted between the backing sheet 2 and the rear wall 9 of the channel member. The protrusions 62 and 63 are formed either by mechanically deforming the locking member 60, by welding material to the surface or by the addition of a second material to the surface. Slots 64 and 65 are cut or punched out of the rear wall 9 of the channel member in a location such that the protrusion 62 will mate with slot 64 when the locking member 64 is inserted into the position shown in FIG. 6. Likewise, protrusion 63 mates with slot 65. Although friction between the rear wall 9 and the backing member 2 holds the locking member 60 in place, the addition of the mating protrusions and slots assists in maintaining the spacial relationship between the parts.

In the second exemplary embodiment as in the first, th channel member has some resiliency so that the walls of the channel member will yield to allow insertion of the locking member, and the resiliency tends to hold the parts together by increasing frictional forces as stated above. In order to improve the hold of the parts together, biasing means on the locking means is provided to create a force between the channel members and the rigid backing sheet to hold the locking means to the channel member. Numerous biasing means are contemplated. For example, resilient material could be placed between the members to create a force therebetween. In the second exemplary embodiment, the biasing means comprises a spring 67 which is partially punched from surface 61 of locking member 60. The biasing means in the form of leaf spring 67 applies a force against the backing sheet 2 to force the locking member against channel member 5 and acts to maintain the protrusions 62 and 63 in slots 64 and 65. Sheets 2 and 3 may be of various thicknesses, and matting may be added, both of which change thickness (t), but the biasing means compensates for these changes. In a similar manner, the tooth means 34 in the first exemplary embodiment may provide similar spring bias to add to frictional forces holding the parts together.

The locking means surface is generally L-shaped with a pair of outside edges 69 and 70 and pair of inside edges 71 and 72. Similarly, the locking means 20 of the first exemplary embodiment has a pair of outside edges 29, 30 and inside edges 31, 32. Gripping means are provided to assist in the removal and insertion of the locking means. The gripping means comprise upright members 33 (FIGS. 1-4) or 73 (FIGS. 5-8). When the frame is being assembled or disassembled, upright members 33 or 73 provide a convenient grip for the user.

The upright members 33, 73 serve another function in that when the frame is assembled, they help prevent relative movement between the adjacent channel members. As shown in FIGS. 2 and 6, the upright members 33, 73 rest against the inside edge of the channel member rear walls 9 and assist the slot-protrusion system in maintaining alignment. Either upright member 33, 73 could be used in either embodiment. Upright member 33 is provided with notches 34' for allowing the frame to be hung from upright member 33 from a nail without sliding therefrom. Hole 74 on upright member 73 could accomplish the same function.

In order to assemble the picture frame of the second embodiment, at least two adjacent channel members are placed on the edges of the sandwich. The locking member is inserted between the channel member rear walls 9 and the backing sheet until the protrusions "snap" into place in the slots with the gripping portion aligned as shown in FIG. 6. This is repeated until all corners are fastened. The frame is then assembled and assumes a configuration similar to that shown in FIG. 5.

It should be recognized that various modifications could be made within the scope of the invention. As an example, nonrectangular frames could be made by modifying the angles discussed, especially the miter joint, the angles of locking members 20 or 60, and the angles of the slots and protrusions. Various other modifications are similarly contemplated.

I claim:
1. In a frame having channel members extending along each edge of framed material, each channel member abutting another channel member at the corner of the framed material, the improvement comprising:
   locking means slidable between the framed material and a pair of abutting channel members at each corner of the framed material and means on the channel members for receiving and holding the locking means whereby the locking means performs the dual function of holding the channel members together in abutting relationship and of holding the channel members on the framed material.

2. The improvement of claim 1 wherein said channel members include slot means therein, and said locking means has protrusion means thereon to extend into said slot means, said slot means receiving said protrusion means when said locking means is inserted between the framed material and the channel members to hold the locking means, the framed material and the channel members together.

3. The improvement of claim 2, wherein said frame includes a transparent sheet for displaying an object therethrough, a backing sheet on the other side of the object, said channel members having a channel width substantially the same as the combined thickness of the transparent sheet, the object, the rigid backing sheet and the locking means.

4. The improvement of claim 2 said slot means having tapered side walls, said protrusion means being slidable into said slot means against the side walls to wedge the channel members together.

5. In the frame of claim 4 wherein said channel members terminate in channel ends which abut channel ends of adjacent channel members, said channel members further comprising a channel member front portion and a channel member rear portion connected together by a channel edge portion, the improvement further comprising:
   said slot means extending from the side of one of said channel member portions opposite the channel edge whereby insertion of said locking means between the framed material and the channel members inserts the protrusion means into said slot means to wedge the adjacent channel member together.

6. The improvement of claim 5 wherein said slot means comprises slot walls, a first slot wall nearer the channel end being angled away from the channel end from one end of one channel member portion toward the channel edge, said protrusion means comprising a pair of protrusions spaced apart on the locking means so that each protrusion fits into slot means on abutting channel means along the first slot walls to wedge the channel members together.

7. The improvement of claim 6 comprising bridge means attached to said protrusion means, the area between slot means on abutting channel portions on said channel members being secured under said bridge means for holding adjacent channel member together.

8. The improvement of claim 7 wherein said locking means comprises tooth means for gripping the framed material to prevent the locking means from being removed from between the channel member and the framed material.

9. The improvement of claim 1, wherein said frame includes a transparent sheet for displaying an object therethrough, a backing sheet on the other side of the object, said channel members having a channel width substantially the same as the combined thickness of the transparent sheet, the object, the rigid backing sheet and the locking means.

10. The improvement of claim 9 further including biasng means on the locking means to create a force between the channel members and the rigid backing sheet to hold the locking means to the channel member.

11. The improvement of claim 10 wherein said biasing means comprises spring cut-out means on said locking means which is biased against said rigid backing sheet to push said locking means against said channel members.

12. The improvement of claim 11 wherein said spring cut-out means comprises tooth means for gripping the framed material to prevent the locking means from being removed from between the channel members.

13. The improvement of claim 12 wherein said tooth means faces away from the leading edge of the locking means which is inserted between the channel members and the framed materials so that the tooth means can slide along the framed material when the locking means is inserted but the tooth means grips the framed material preventing the locking means from being removed.

14. The improvement of claim 4, wherein the channel members include front and rear portions extending along a portion of both sides of the framed material, and an edge extending along the edge of the framed material, the portions of the channel members being resilient to apply force to the locking member when it is inserted between the framed material and the portion of the channel member.

15. The improvement of claim 1 wherein said locking means comprises gripping means to assist in the removal and insertion of said locking means.

16. The improvement of claim 15, wherein the distance from the slot to the inside edge of the channel member is substantially equal to the distance from a corresponding location on the protrusion to the gripping means, said gripping means contacting said channel members to align the locking means with the channel members.

17. The improvement of claim 1 wherein said locking means includes a surface for insertion between the framed material and the channel member, and at least one upright member extending generally upward from said surface to provide a grip to assist in insertion and removal of the locking means.

18. The improvement of claim 17, said locking means surface being L-shaped with a pair of outside edges and inside edges, said inside edges each having one of said upright members extending generally perpendicularly from said locking means, said upright members being positioned against the channel members when said locking member is inserted between said framed material and the channel member for preventing relative movement between and for aligning two adjacent channel members.

19. The improvement of claim 17 wherein each of said upright members comprise means having notches thereon for preventing the upright members from sliding along a nail when the upright members are hung on nails for supporting the frame.

20. A picture frame for a picture to be held between a backing sheet and a front sheet in a sandwich, comprising frame means including a plurality of frame sections extending around the edges of the backing sheet and front sheet, each frame section intersecting adjacent frame sections at the ends of the frame sections at the corners of the backing sheet and front sheet, said frame means having side portions extending over a portion of the outside face of the backing sheet and the front sheet, the side portions along at least one face being resilient to hold the backing sheet and the front sheet together, and locking means insertable between the one side of each of two adjacent frame sections at the ends of each portion and one of the sheets to provide the dual functions of holding the frame means to the sandwich and for holding the frame sections together in abutting relation.

21. The picture frame of claim 20 wherein said frame means comprises a plurality of frame sections, one of each edge of the sandwich said frame sections intersecting at the corners of the sandwich, said locking means being insertable at the corners to hold adjacent frame sections together.

22. The picture frame of claim 20 wherein said locking means has at least one protrusion and at least one side portion having a slot to receive the protrusion when said locking means is inserted between the side portion and the one sheet.

23. In a method of assembling a frame comprising placing channel members around the edges of framed material abutting each adjacent channel member and locking the channel members together, the improvement comprising,
    inserting locking means between the framed material and the ends of abutting channel members whereby friction between the framed material, the channel members and the locking means performs the dual function of holding the adjacent channel members together in abutting relation and for holding the channel members on the framed material.

24. In the method of claim 23 wherein said channel members have an angled slot at each end thereof and the locking means has a pair of protrusions each fitting into one angled slot of two adjacent channel member, the improvement further comprising:
    pinching the ends of the channel members together by inserting the protrusions along the angled slots and wedging the protrusions along the angled slots.

* * * * *